(12) United States Patent
Sakamaki et al.

(10) Patent No.: US 10,720,089 B2
(45) Date of Patent: Jul. 21, 2020

(54) DISPLAY DEVICE

(71) Applicant: DENSO CORPORATION, Kariya, Aichi-pref. (JP)

(72) Inventors: Tomohiko Sakamaki, Kariya (JP); Toshifumi Tooi, Kariya (JP); Masato Nomoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 92 days.

(21) Appl. No.: 15/744,459

(22) PCT Filed: Jul. 1, 2016

(86) PCT No.: PCT/JP2016/069586
§ 371 (c)(1),
(2) Date: Jan. 12, 2018

(87) PCT Pub. No.: WO2017/085960
PCT Pub. Date: May 26, 2017

(65) Prior Publication Data
US 2018/0204493 A1    Jul. 19, 2018

(30) Foreign Application Priority Data

Nov. 16, 2015  (JP) .................................. 2015-224131

(51) Int. Cl.
*G09G 3/18*     (2006.01)
*G09F 13/08*    (2006.01)
(Continued)

(52) U.S. Cl.
CPC ............... *G09G 3/18* (2013.01); *B60K 35/00* (2013.01); *B60K 37/00* (2013.01); *G02F 1/133606* (2013.01); *G09F 13/04* (2013.01); *G09F 13/08* (2013.01); *B60K 2370/331* (2019.05); *B60K 2370/336* (2019.05); *B60K 2370/34* (2019.05);
(Continued)

(58) Field of Classification Search
None
See application file for complete search history.

(56) References Cited

U.S. PATENT DOCUMENTS

2012/0099292 A1* 4/2012 Yim ..................... G09F 13/08
362/97.1
2015/0212335 A1* 7/2015 Shimatani .......... G02B 27/2292
359/479

FOREIGN PATENT DOCUMENTS

JP          2012079425 A      4/2012

* cited by examiner

*Primary Examiner* — Kenneth B Lee, Jr.
(74) *Attorney, Agent, or Firm* — Harness, Dickey & Pierce, P.L.C.

(57) ABSTRACT

An attenuation portion is to illuminate first and second display objects while attenuating light. A display element causes light to enter the attenuation portion to illuminate the first display object in a display region. A light source irradiates light to illuminate the second display object in the display region. A display forming member has a light-blocking layer and an attenuation layer. The light-blocking layer has a light-transmitting portion defining a shape of the second display object. The attenuation layer covers the light-blocking layer from a display region side to attenuate light, which is from the light source and passes through the light-transmitting portion. The display forming member indicates the second display object in the display region with emission of light which is attenuated through the attenuation layer and enters the attenuation portion.

8 Claims, 5 Drawing Sheets

(51) Int. Cl.
 *G09F 13/04* (2006.01)
 *B60K 37/00* (2006.01)
 *B60K 35/00* (2006.01)
 *G02F 1/13357* (2006.01)
 *G09F 13/22* (2006.01)
 *G02F 1/1335* (2006.01)

(52) U.S. Cl.
 CPC .. *B60K 2370/345* (2019.05); *B60K 2370/349* (2019.05); *G02F 1/133512* (2013.01); *G02F 1/133603* (2013.01); *G02F 2001/133601* (2013.01); *G02F 2001/133607* (2013.01); *G09F 2013/222* (2013.01)

DISPLAY DEVICE

CROSS REFERENCE TO RELATED APPLICATIONS

This application is a U.S. National Phase Application under 35 U.S.C. 371 of International Application No. PCT/JP2016/069586 filed on Jul. 1, 2016 and published in Japanese as WO 2017/085960 A1 on May 26, 2017. This application is based on and claims the benefit of priority from Japanese Patent Application No. 2015-224131 filed on Nov. 16, 2015. The entire disclosures of all of the above applications are incorporated herein by reference.

TECHNICAL FIELD

The present disclosure relates to a display device to illuminate and indicate multiple display objects in a display region.

BACKGROUND ART

An operation display panel in the related art is disclosed in, for example, Patent Literature 1. The operation display panel is configured to illuminate and indicate a design, such as outline letters, on a periphery of a display provided in a center cluster of a vehicle. The operation display panel has a light-transmitting portion defining a shape of an outline letter or the like, and a film sheet adjusting light transmittance. The light-transmitting portion is illuminated by an LED. When the LED is shut off, the operation display panel changes to so-called a blackout state in which presence of the light-transmitting portion is hard to perceive due to a light attenuation function of the film sheet.

CITATION LIST

Patent Literature

PATENT LITERATURE 1: Publication of Unexamined Japanese Patent Application No. 2012-79425

SUMMARY OF INVENTION

Technical Issue

It is, however, considered that there would be a room to render the presence of the light-transmitting portion harder to perceive for a viewer.

The present disclosure has an object to provide a display device enabling to render presence of a light-transmitting portion hard to perceive for a viewer when light is not emitted without having to decrease light transmittance of an attenuation portion.

More specifically, inventors of the present disclosure had contemplated a display device further covering a front surface side of a display element like a display with an attenuation portion similar to the film sheet of Patent Literature 1. In the display device thus contemplated, an entire display region including both an operation input panel unit and the display element changes to a blackout state as a whole when both of a light source, such as an LED, and the display element are shut off. Consequently, the display device when not emitting light may look more sophisticated.

However, a study conducted on the display device as above had led the inventors to a new issue. That is, when intense extraneous light is irradiated to the display device emitting no light, a screen of the unilluminated display is hard to perceive for a viewer of the display device whereas a shape of the substantial light-transmitting portion is perceivable for the viewer.

In order to solve the new issue, the inventors had conducted a further study to make a shape of the light-transmitting portion hard to perceive for the viewer even under irradiation of intense extraneous light by adjusting transmittance of the attenuation portion to be lower. However, when transmittance of the attenuation portion is adjusted to be low, brightness of light exiting from the display needs to be enhanced further. Hence, it had been hard to adjust transmittance of the attenuation portion to be low.

According to one aspect of the present disclosure, a display device is to illuminate and indicate a plurality of display objects including at least a first display object and a second display object in a display region. The display device comprises an outer surface panel including an attenuation portion, which is to illuminate and indicate the display objects while attenuating light. The display device further comprises a display element to cause light to enter the attenuation portion to illuminate and indicate the first display object in the display region and enabled to change a display mode of the first display object. The display device further comprises a light source to irradiate light to illuminate and indicate the second display object in the display region. The display device further comprises a display forming member having a light-blocking layer, which has a light-transmitting portion defining a shape of the second display object, and an attenuation layer, which covers the light-blocking layer from a side where the display region is present to attenuate light irradiated from the light source and passing through the light-transmitting portion. The display forming member is to cause light, which is attenuated through the attenuation layer, to enter the attenuation portion to illuminate and indicate the second display object in the display region.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, several embodiments of the present disclosure will be described with reference to the drawings. Corresponding components in respective embodiments below may be denoted with the same reference numerals and a description thereof may not be repeated where appropriate. When a part of a configuration is described in the respective embodiments below, a configuration described in any preceding embodiment may apply to a rest of the configuration. In addition to a combination of configurations explicitly described in any embodiment, configurations of two or more embodiments can be combined in part even when such a combination is not explicitly described unless a difficulty arises in the combination.

First Embodiment

Figure 1:
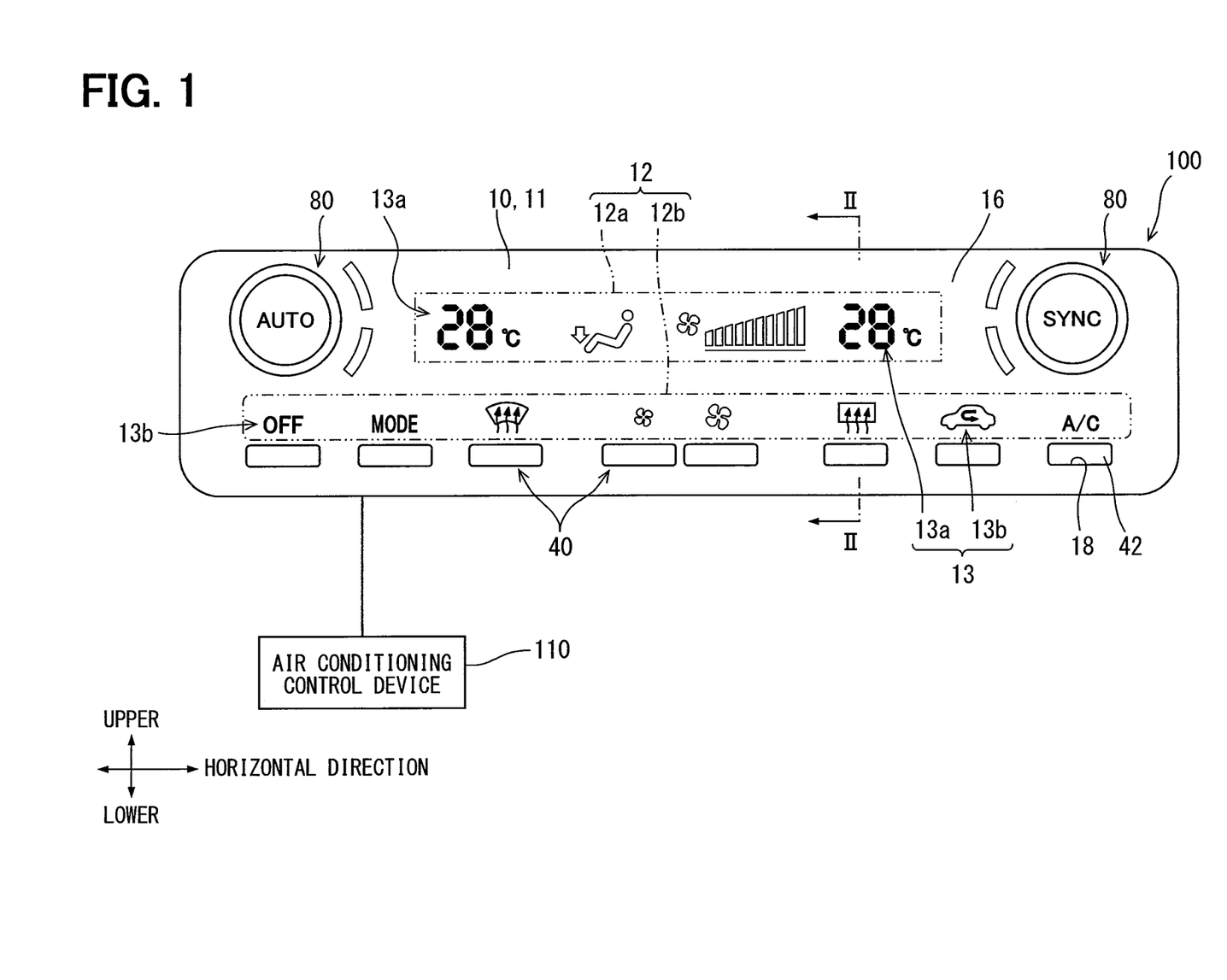
FIG. 1 is a front view of an operation device according to a first embodiment.

An operation device 100 of a first embodiment shown in FIG. 1 is electrically connected to an air conditioning control device 110, and furnished with a function of a user interface to operate an air-conditioning device installed to a vehicle. The operation device 100 is provided in a compartment of the vehicle at a center cluster or the like which is easy to reach for a driver by hand. A front surface of the operation device 100 is in a longitudinal shape elongated in a horizontal direction. In addition to multiple push switches 40 and two dial knobs 80, a display region 12 where multiple display objects 13 can be indicated is provided to the front surface of the operation device 100.

The push switches 40 are aligned side by side in the horizontal direction along a lower edge of the front surface of the operation device 100. A pressing operation by the driver or the like is inputted on the push switches 40. The respective push switches 40 are assigned with, for example, an air volume adjusting function, a mode switching function of switching an inside air circulation mode to an outside air circulation mode and vice versa, an outlet switching function, an operation state changing function of changing operation states of the air-conditioning device.

The two dial knobs 80 are provided to the front surface of the operation device 100. The dial knobs 80 are located at ends respectively in the horizontal direction. The dial knobs 80 are located on the upper side of the push switches 40. A rotational operation by the driver or the like is inputted to the dial knobs 80. The respective dial knobs 80 are assigned with, for example, pre-set temperature adjusting functions of adjusting pre-set temperatures on a driver seat side and a front passenger seat side.

The display region 12 includes at least a multi-display region 12a and a symbol display region 12b. In the display region 12, the multiple display objects 13 including at least a status icon 13a and a symbol icon 13b are illuminated and indicated.

The multi-display region 12a is located between the two dial knobs 80. The multi-display region 12a is in a horizontally-long rectangular shape elongated in the horizontal direction of the operation device 100. Multiple status icons 13a are indicated in the multi-display region 12a. The status icons 13a indicate operation states presently set in the air conditioning control device 110 according to inputs of operations on the push switches 40 and the dial knobs 80. More specifically, the status icons 13a are capable of schematically indicating pre-set temperatures on the driver seat side and the front passenger seat side, settings on outlets, a setting on an air volume, and so on.

The symbol display region 12b is located above the multiple push switches 40. The symbol display region 12b is horizontally elongated along the horizontal direction along which the multiple push switches 40 are aligned. Multiple symbol icons 13b are indicated in the symbol display region 12b. One symbol icon 13b is indicated above one push switch 40. The symbol icon 13b is a set of letters or a figure schematically indicating or representing a function assigned to the adjacent push switch 40.

A detailed configuration of the operation device 100 as above will now be described with reference to FIG. 1 and FIG. 2.

The operation device 100 includes an outer panel 10, a liquid crystal display element 30, a circuit board 50, push knobs 41, a housing 60, a symbol prism 28, a display forming plate 20, and so on. Hereinafter, a side where the outer panel 10 is present with respect to the circuit board 50 is referred to as a front surface side, and a side where the circuit board 50 is present with respect to the outer panel 10 is referred to as a rear surface side.

The outer panel 10 is made of a light-transmitting resin material, such as acrylic resin and polycarbonate resin, and formed in a plate shape. The resin material of the outer panel 10 is colored in gray or the like to attenuate incident light and to cause the attenuated light to exit. The outer panel 10 is attached to the housing 60 and forms the front surface of the operation device 100. The outer panel 10 has an attenuation portion 11.

The attenuation portion 11 is provided with an incident plane 15, an exiting plane 16, and multiple switch openings 18. The incident plane 15 is a rear surface of the attenuation portion 11 opposed to the liquid crystal display element 30 and the display forming plate 20. The exiting plane 16 is an outer front surface of the attenuation portion 11 exposed to the compartment, from which light entering from the incident plane 15 exits. The exiting plane 16 forms the display region 12. In the attenuation portion 11, the incident plane 15 is in a shape conforming to the substantially flat exiting plane 16. Hence, a plate thickness of the attenuation portion 11 is substantially uniform across the entire display region 12. Light emitted to illuminate and indicate the display objects 13 enters the attenuation portion 11 from the incident plane 15 and exits from the exiting plane 16 after being attenuated. Light transmittance of the attenuation portion 11 is set to, for example, about 10 to 20 percent. Light transmittance of the attenuation portion 11 is substantially uniform in an overall region within which the display region 12 is provided.

The switch openings 18 are through-holes extending through the attenuation portion 11 in a plate thickness direction. The switch openings 18 are provided along the horizontal direction of the operation device 100 while being spaced one from another. An opening shape of the switch openings 18 conforms to an outer shape of tip ends of the push knobs 41. One push knob 41 is inserted into one switch opening 18 from the rear surface side until the tip end protrudes to the front surface side.

The liquid crystal display element 30 includes a liquid crystal panel 31, a backlight prism 33, a backlight LED (Light Emitting Diode) 34, and the like. The liquid crystal panel 31 has a display screen 32 opposed to the incident plane 15 across the display forming plate 20 in between. The visually identifiable multiple status icons 13a are indicated on the display screen 32 through the multi-display region 12a. Multiple segments defining shapes of the respective status icons 13a are preliminarily provided to the display screen 32. Each segment varies light transmittance in response to application of a voltage. The liquid crystal panel 31 of the first embodiment is a negative liquid crystal panel. When a voltage is applied, the segment changes to a light-transmitting state by increasing light transmittance. The liquid crystal panel 31 is capable of changing display configurations of the status icons 13a correspondingly to an operation state of the air conditioning control device 110. When an operation of the liquid crystal display element 30 is stopped, the liquid crystal panel 31 lowers light transmittance of all the segments to change the display screen 32 uniformly to a blackout state.

The backlight prism 33 is made of a colorless and transparent resin material, such as acrylic resin. The backlight prism 33 is provided between the liquid crystal panel 31 and the backlight LED 34. The backlight LED 34 is a light source to illuminate and indicate the status icons 13a in the multi-display region 12a. More than one backlight LED 34 is mounted to the circuit board 50 and each irradiates white light to the backlight prism 33. Light from the backlight LED 34 is dispersed by the backlight prims 33 and reaches a rear surface of the liquid crystal panel 31 to illuminate an image formed on the display screen 32 by passing through the image. The symbol icons 13b are visually identified in the multi-display region 12a when light passing through the segments further passes through the attenuation portion 11.

The circuit board 50 is formed in a plate shape and held by the housing 60 in a posture conforming to the outer panel 10. The circuit board 50 is provided with a control circuit 51 controlling an operation of the operation device 100. The control circuit 51 is capable of performing at least a display control on the display objects 13 and an operation control to change settings of the air conditioning control device 110 according to an operation input. The control circuit 51 includes multiple tactile switches 53, multiple symbol LEDs 54, the backlight LEDs 34, a drive circuit of the liquid crystal panel 31, a micro-controller controlling the foregoing components, and the like.

The multiple tactile switches 53 and the multiple symbol LEDs 54 are mounted on a front surface of the circuit board 50 along the horizontal direction. The tactile switch 53 is an electronic part converting an operation input to the corresponding push switch 40 into an electrical signal. The symbol LED 54 is a light source irradiating light which is emitted to illuminate and indicate the corresponding symbol icon 13b in the symbol display region 12b. The symbol LEDs 54 irradiate, for example, white light as with the backlight LEDs 34.

The push knobs 41 are made of a resin material and formed in a column shape. The push knobs 41 are supported on the housing 60 in a posture where an axial direction is set substantially orthogonal to the circuit board 50. The push knobs 41 are displaceable along the axial direction. An input portion 42 and a pressing portion 43 are provided to each push knob 41 at both ends in the axial direction. The input portion 42 is exposed to the front surface side from the switch opening 18. The input portion 42 is plated in silver color to look more sophisticated. One pressing portion 43 is opposed to one tactile switch 53. The pressing portion 43 makes contact with the tactile switch 53 when a pressing operation is inputted into the input portion 42 to temporarily switch the tactile switch 53 to an ON state.

The housing 60 houses the liquid crystal display element 30, the circuit board 50, the display forming plate 20, and the like. The housing 60 includes an inner case 61, a rear case 68, and the like. The inner case 61 and the rear case 68 are made of a light-blocking resin material, such as ABS resin.

The inner case 61 is located between the outer panel 10 and the rear case 68. The outer panel 10 is fit to the inner case 61 on the front surface side. The circuit board 50 is combined with the inner case 61 on the rear surface side. The inner case 61 is provided with a backlight reflector 62, a symbol reflector 63, and a knob supporting portion 64.

The backlight reflector 62 is provided between the liquid crystal panel 31 and the circuit board 50. The backlight reflector 62 is formed in a tubular shape expanding in inner size to the front surface side. The backlight reflector 62 houses the backlight prism 33. The backlight reflector 62 thus restricts leakage of light from the backlight prism 33.

The symbol reflector 63 is provided under the backlight reflector 62. The symbol reflector 63 is formed in a tubular shape, an axial direction of which is substantially orthogonal to the circuit board 50. The symbol reflector 63 houses the symbol prism 28. The symbol reflector 63 thus restricts leakage of light from the symbol prism 28. One knob supporting portion 64 is provided below one symbol reflector 63. On push knob 41 is stored in one knob supporting portion 64 while allowing for displacement in the axial direction.

The rear case 68 is attached to a rear surface side of the inner case 61. The rear case 68 defines a space in which the circuit board 50 is stored.

As with the backlight prism 33, the symbol prism 28 is made of colorless and transparent acrylic resin or the like. The backlight prism 33 is provided between the display forming plate 20 and the symbol LED 54. The symbol prism 28 guides light irradiated from the symbol LED 54 to the front surface side for the light to exit from a prism exiting plane 29 opposed to the display forming plate 20 toward the symbol display region 12b.

Figure 2:
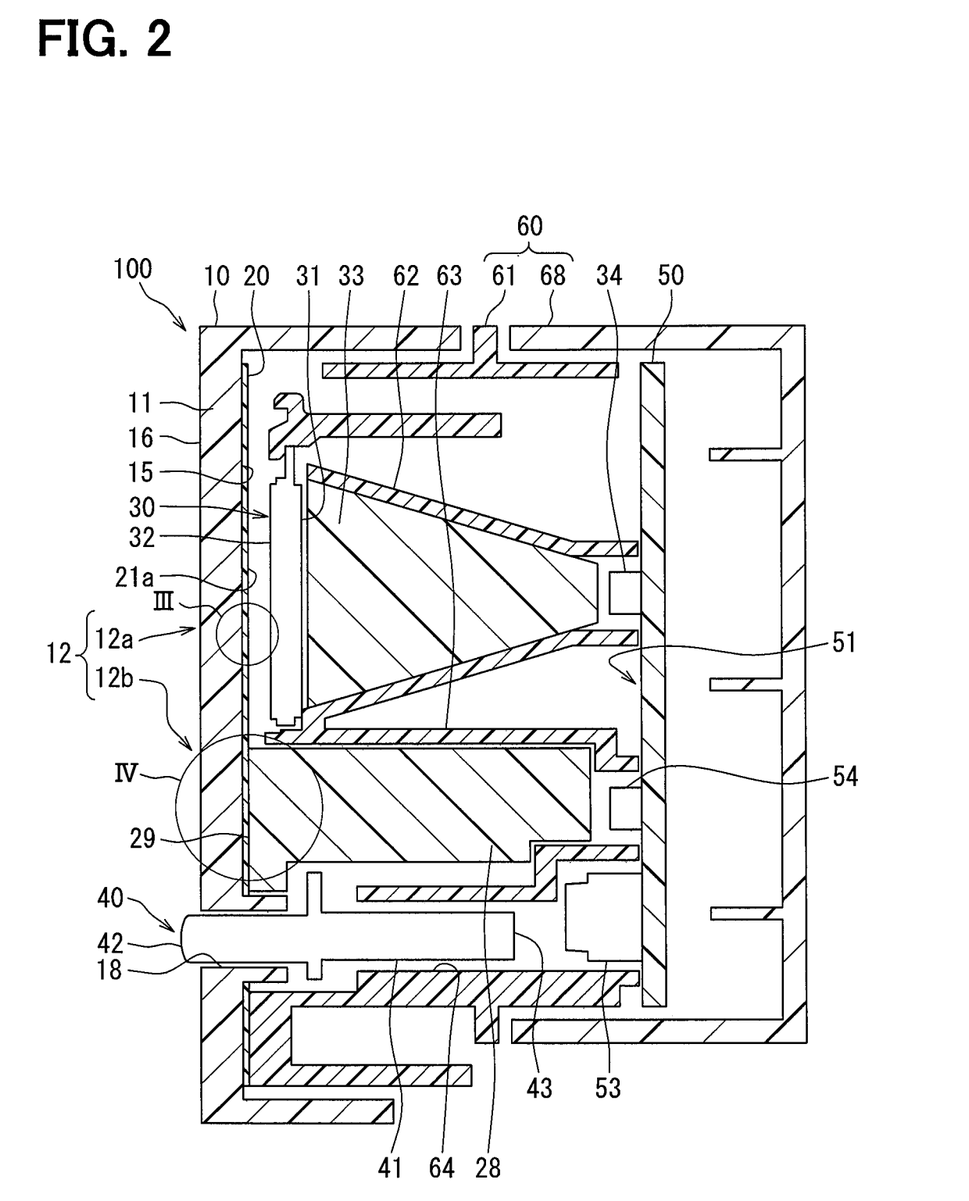
FIG. 2 is a longitudinal sectional view taken along the line II-II of FIG. 1 and is used to describe a configuration of the operation device.
Figure 3:
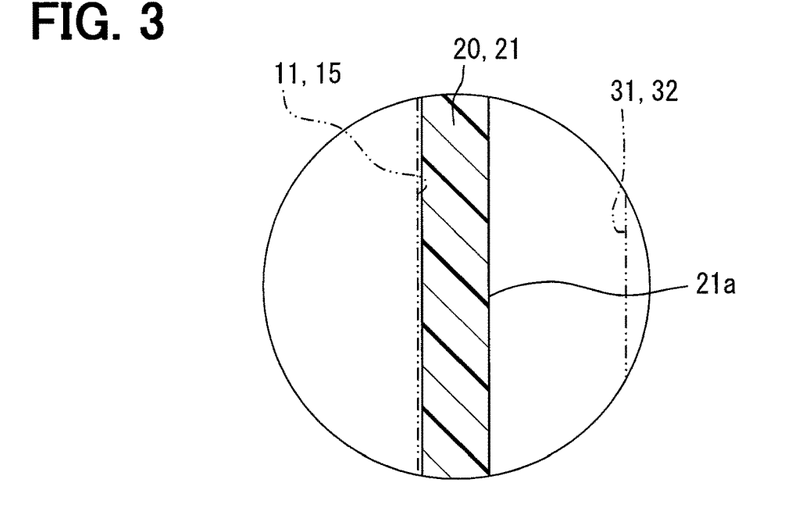
FIG. 3 is an enlarged view of a region III of FIG. 2.
Figure 4:
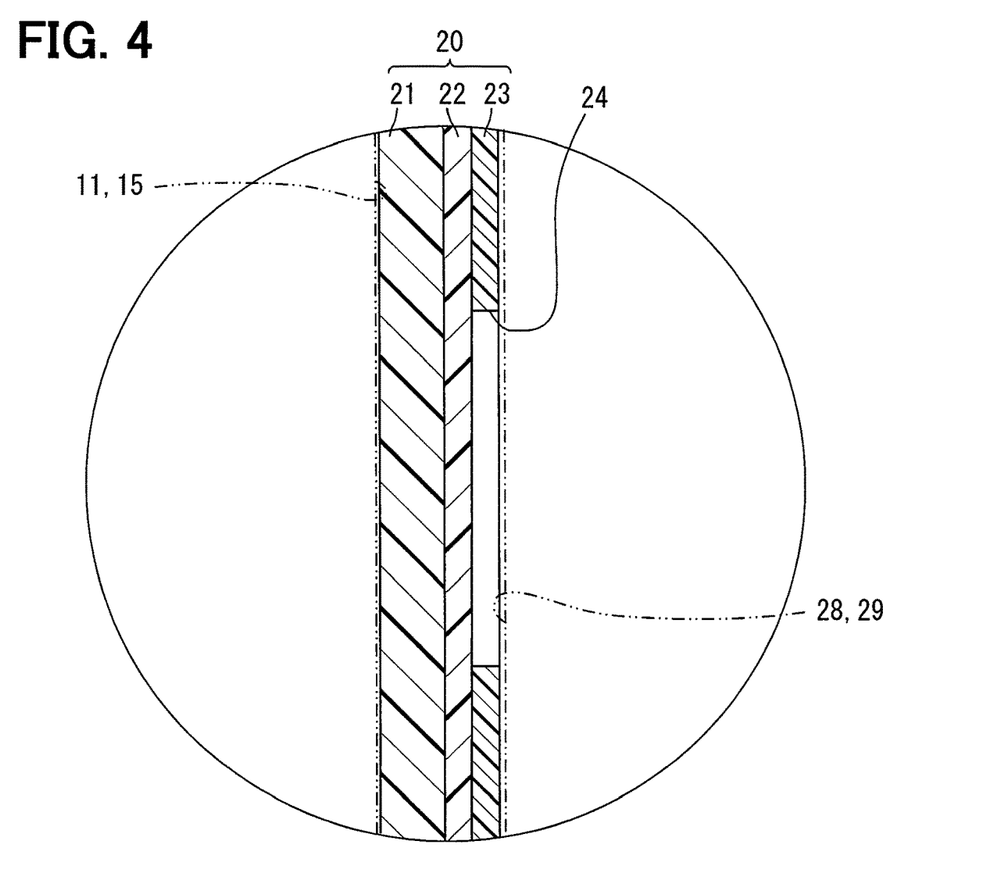
FIG. 4 is an enlarged view of a region IV of FIG. 2.

As are shown in FIG. 2 through FIG. 4, the display forming plate 20 is formed in a plate shape which entirely corresponds to a shape of the display region 12. The display forming plate 20 is provided between the attenuation portion 11 and the liquid crystal panel 31 in a posture where a plate surface direction is set parallel to the circuit board 50 and the attenuation portion 11. The display forming plate 20 includes a light-transmitting base material sheet 21, a light-blocking printed layer 23, a smoke printed layer 22, and the like.

The light-transmitting base material sheet 21 is a thin-plate member made of a colorless and transparent light-transmitting material, for example, polycarbonate. The light-transmitting base material sheet 21 is provided on the front surface side of both of the symbol prism 28 and the liquid crystal panel 31, and covers both of the display screen 32 and the prism exiting plane 29 integrally from a side where the display region is present. The light-transmitting base material sheet 21 supports the light-blocking printed layer 23 and the smoke printed layer 22, neither of which is capable of maintaining a shape by itself. The light-transmitting base material sheet 21 is located on a side where the attenuation portion 11 is present with respect to the smoke printed layer 22 and the light-blocking printed layer 23. The display forming plate 20 is provided with a smooth front surface of the light-transmitting base material sheet 21 opposed to the incident plane 15 of the attenuation portion 11.

The light-blocking printed layer 23 is made of a light-blocking black coating material or the like applied on the smoke printed layer 22. The light-blocking printed layer 23 is provided with multiple light-passing openings 24. The light-passing openings 24 are chipped portions provided to the light-blocking printed layer 23 for light to pass through. An opening shape of each light-passing opening 24 is substantially same as a shape of the corresponding symbol icon 13b (see FIG. 1). In the manner as above, the light-passing openings 24 define shapes of the symbol icons 13b. The light-blocking printed layer 23 is provided to a rear surface of the light-transmitting base material sheet 21 only in a region covering the prism exiting plane 29 by avoiding a liquid crystal cover region 21a which covers the display screen 32. Hence, the light-blocking printed layer 23 does not block light exiting from the liquid crystal panel 31.

The smoke printed layer 22 is provided between the light-transmitting base material sheet 21 and the light-blocking printed layer 23. The smoke printed layer 22 is made of a light-transmitting coating material with adjusted light transmittance. The display forming plate 20 is produced by providing the smoke printed layer 22 on one surface of the light-transmitting base material sheet 21 first, and subsequently providing the light-blocking printed layer 23 to cover the smoke printed layer 22.

The smoke printed layer 22 is formed in a thin-film shape thinner than the attenuation portion 11. Light transmittance of the smoke printed layer 22 is set to, for example, about 25 percent, which is higher than the light transmittance of the attenuation portion 11. The smoke printed layer 22 covers the light-blocking printed layer 23 including the light-passing openings 24 from the side where the display region 12 is present. Light transmittance of the smoke printed layer 22 is homogenous across an entire region covering the light-blocking printed layer 23.

Owing to the configuration as above, the smoke printed layer 22 attenuates light irradiated from the symbol LED 54 and passing through the light-passing opening 24. In the display forming plate 20, the symbol icons 13b (see FIG. 1) are illuminated and indicated in the symbol display region 12b by causing light attenuated in the smoke printed layer 22 to enter the light attenuation portion 11.

As with the light-blocking layer 23, the smoke printed layer 22 is provided to the rear surface of the light-transmitting base material sheet 21 only in a region covering the prism exiting plane 29 by avoiding the liquid crystal cover region 21a which covers the display screen 32. Hence, the smoke printed layer 22 does not attenuate light exiting from the liquid crystal panel 31.

Figure 5:
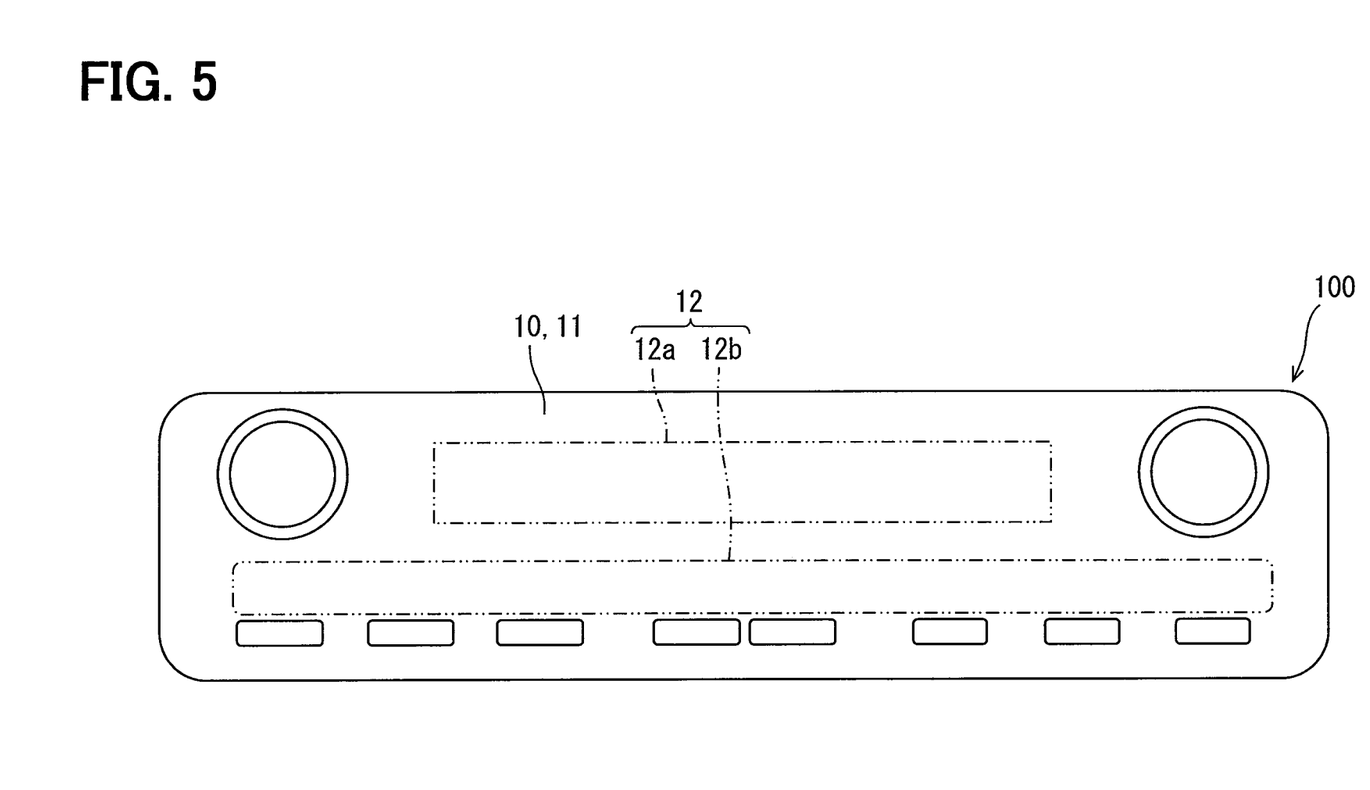
FIG. 5 is a front view of the operation device when a display region is in a blackout state.

The following will describe a state when the operation device 100 is not emitting light by shutting off all of the liquid crystal panel 31, the backlight LEDs 34, and the symbol LEDs 54 with reference to FIG. 5 and with reference to FIG. 1 and FIG. 2.

The status icons 13a disappear from the multi-display region 12a when an operation of the liquid crystal panel 31 is stopped and the backlight LEDs 34 are shut off. Accordingly, no light enters the attenuation portion 11 from the display screen 32 and the display screen 32 is hard to visually identify through the attenuation portion 11. When the symbol LEDs 54 are shut off, the symbol icons 13b are no longer illuminated and indicated and disappear from the symbol display region 12b. The light-passing openings 24 (see FIG. 4) are thus hard to visually identify through the attenuation portion 11. Consequently, the operation device 100 changes the entire display region 12 into a blackout state.

A case where intense extraneous light is irradiated to the front surface of the operation device 100 in the blackout state as above will now be described with reference to FIG. 2 through FIG. 4.

When the operation device 100 does not emit light, the entire display screen 32 of the liquid crystal panel 31 located on the rear surface side of the multi-display region 12a is in a blackout state. In such a state, overall light reflectance of the display screen 32 is low and light reflectance at each position across the display screen 32 is substantially uniform. Hence, even when intense extraneous light is irradiated to the multi-display region 12a, presence of the display screen 32 is still hard to perceive through the attenuation portion 11.

Meanwhile, both of the black light-blocking printed layer 23 which hardly reflects light and the high-reflective prism exiting plane 29 peeked through the light-passing openings 24 are located on the rear surface side of the symbol display region 12b. When intense extraneous light is irradiated to the multi-display region 12a in absence of the smoke printed layer 22, the extraneous light is reflected on the prism exiting plane 29 and may possibly exit to the front surface side by passing through the attenuation portion 11. Hence, shapes of the light-passing openings 24 resembling the symbol ions 13b (see FIG. 1) are seen through the attenuation portion 11 and visible to the viewer.

In order to avoid such a state, the light-blocking printed layer 23 provided with the light-passing openings 24 is covered with the smoke printed layer 22 from the side where the display region 12 is present in the first embodiment. Hence, intense extraneous light irradiated to the front surface of the operation device 100 is attenuated not only in the attenuation portion 11 of the outer panel 10, but also in the smoke printed layer 22 of the display forming plate 20 between the display region 12 and the light-passing openings 24. More specifically, extraneous light irradiated to the symbol display region 12b reaches the light-blocking printed layer 23 by a quantity calculated by multiplying transmittance of the attenuation portion 11 by transmittance of the smoke printed layer 22, and the quantity is found to be as small as about 5 percent. In addition, only about 5 percent of the reflected extraneous light from the prism exiting plane 29 exits from the symbol display region 12b. Hence, presence of the light-passing openings 24 can be made hard to perceive for the viewer when operation device 100 is not emitting light without having to lower light transmittance of the attenuation portion 11.

Further, because light transmittance of the attenuation portion 11 is maintained high, the status icons 13a can be indicated at high brightness without having to increase brightness of the backlight LEDs 34. Hence, a need to increase the number of the backlight LEDs 34 and a need to add a cooling structure (for example, a fan) for the backlight LEDs 34 in addressing an increase in applied current value are eliminated. Consequently, the operation device 100 is capable of maintaining a simple configuration which contributes to a cost reduction.

In the first embodiment, the light-transmitting base material sheet 21 of the display forming plate 20 covers the display screen 32 and the light-passing openings 24 integrally on an inner side of the outer panel 10. Hence, an edge of the light-transmitting base material sheet 21 is located on an outer peripheral side of the display screen 32 and the prism exiting plane 29. Accordingly, even when intense extraneous light is irradiated to the display region 12 and the inner side of the attenuation portion 11 is slightly seen through, only the front surface of the flat light-transmitting base material sheet 21 is visually identified. A state where the edge of the see-through light-transmitting base material sheet 21 is visually identified by the viewer and the operation device 100 looks unsophisticated can be avoided with the configuration not to provide the edge of the light-transmitting base material sheet 21 on the rear surface side of the attenuation portion 11 as above.

In the first embodiment, the smoke printed layer 22 is located more on the rear surface side than the light-transmitting base material sheet 21. Hence, even when intense extraneous light is irradiated to the display region 12, the flat front surface of the light-transmitting base material sheet 21 alone is slightly seen through. Consequently, a state that shadow of the edge of the smoke printed layer 22 is visually identified by the viewer is avoided.

In the first embodiment, the attenuation portion 11 forming the display region 12 has substantially a constant thickness across the outer panel 10. Hence, a state where a portion in which the plate thickness varies is locally illuminated and the display region 12 looks unnatural is avoided. In addition, a state is also avoidable where shapes of the symbol icons 13b look deformed due to overlapping of a portion where the plate thickness varies with the symbol icons 13b illuminated and indicated when the driver moves a visual line, for example, from side to side, and looks the display region 12.

In the first embodiment, the negative liquid crystal panel 31 is used in the liquid crystal display element 30. Hence, the entire display screen 32 is changed to a blackout state when an operation of the liquid crystal panel 31 is stopped. Owing to the configuration as above, even when light passes through the attenuation portion 11 and reaches the display screen 32, light reflected to the attenuation portion 11 is negligible. Hence, even when high light transmittance is set on the attenuation portion 11, a state that the display screen 32 is seen through the outer panel 10 is least likely to occur.

In the first embodiment, the outer panel 10 corresponds to "an outer surface panel", the status icons 13a to "a first display object", and the symbol icons 13b to "a second display object". The display forming plate 20 corresponds to "a display forming member", the light-transmitting base material sheet 21 to "a light-transmitting base material", the liquid crystal cover region 21a to "a region", and the smoke printed layer 22 to "an attenuation layer". The light-blocking printed layer 23 corresponds to "a light-blocking layer", the light-passing openings 24 to "a light-transmitting portion", the liquid crystal display element 30 to "a display element", the symbol LEDs 54 to "a light source", and the operation device 100 to "a display device".

Second Embodiment

Figure 6:
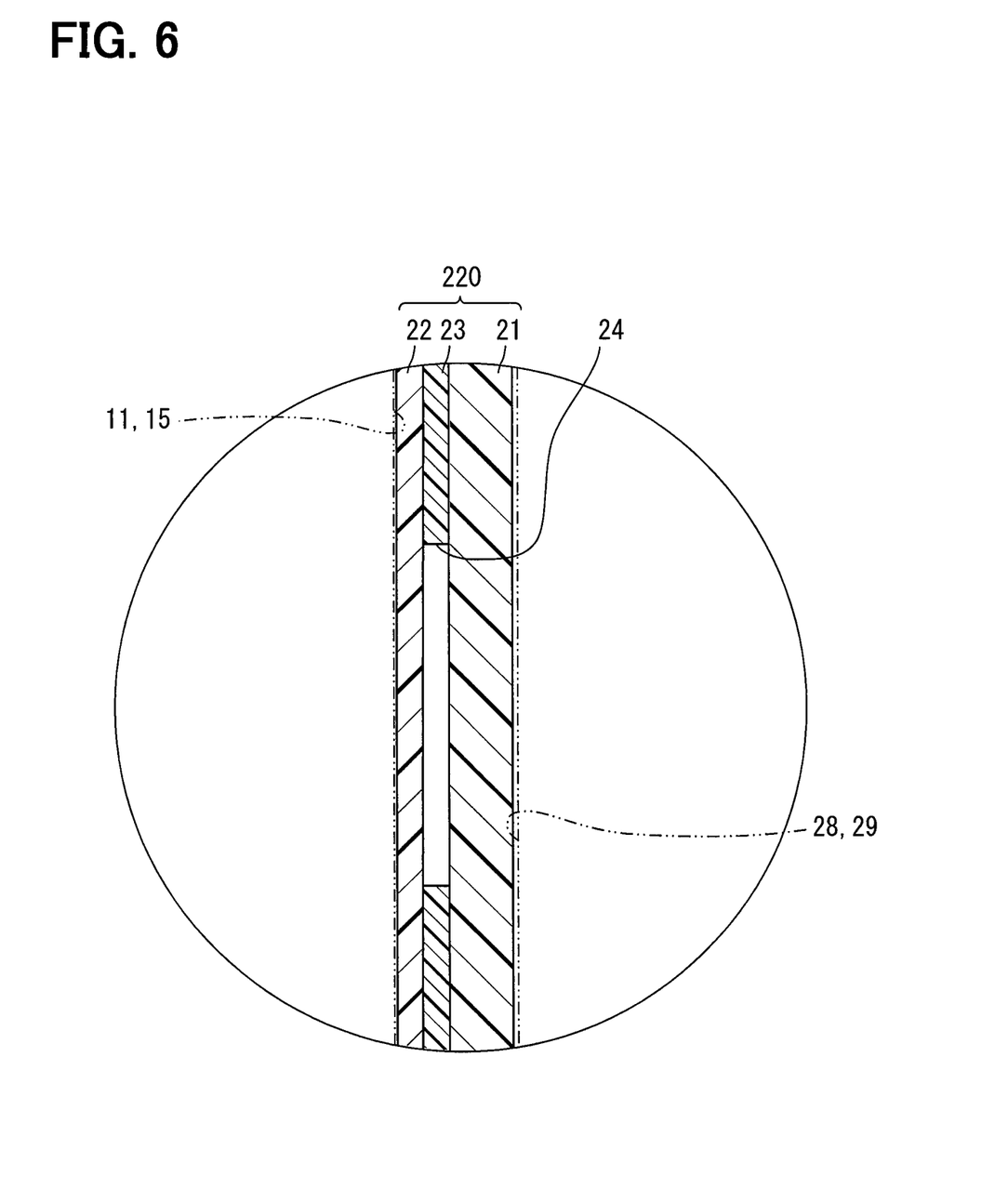
FIG. 6 is a view showing a modification of FIG. 4.

A display forming plate 220 of a second embodiment shown in FIG. 6 is different from the counterpart of the first embodiment above in a positional relationship among a light-transmitting base material sheet 21, a smoke printed layer 22, and a light-blocking printed layer 23. In the display forming plate 220, the light-transmitting base material sheet 21 is located on a rear surface side of the smoke printed layer 22 and the light-blocking printed layer 23, and opposed to a prism exiting plane 29 of a symbol prism 28. Meanwhile, as in the first embodiment above, the smoke printed layer 22 at an opposed position to an incident plane 15 covers the light-blocking printed layer 23 from a side where an attenuation portion 11 is present. In short, the light-blocking printed layer 23 is provided between the light-transmitting base material sheet 21 and the smoke printed layer 22. The display forming plate 220 as above is produced by providing the light-blocking printed layer 23 on one surface of the light-transmitting base material sheet 21 first, and subsequently providing the smoke printed layer 22 to cover the light-blocking printed layer 23.

In the second embodiment described as above, too, the light-blocking printed layer 23 is covered with the smoke printed layer 22 on a side where a display region 12 is present (see FIG. 2). Hence, an effect same as the effect of the first embodiment above can be produced, and presence of light-passing openings 24 can be made hard to perceive for a viewer when light is not emitted. In the second embodiment, the display forming plate 220 corresponds to "the display forming member".

OTHER EMBODIMENTS

While the above has described multiple embodiments, it should be appreciated that an interpretation of the present disclosure is not limited to the embodiments above and the present disclosure is applicable to other various embodiments, either solely or in combination, within the scope of the present disclosure.

In the embodiments above, the light-transmitting base material sheet 21 of the display forming plate 20 covers not only the prism exiting plane 29 but also the display screen 32. However, in a case where a display forming plate covers at least a prism exiting plane, the display forming plate may not necessarily cover a display screen. An opening of a same shape as a display screen may be provided to a display forming plate.

In the embodiments above, light transmittance of the smoke printed layer 22 is set higher than light transmittance of the attenuation portion 11. However, light transmittance of a smoke printed layer and an attenuation portion may be changed as needed. For example, transmittance may be substantially same in both a smoke printed layer and an attenuation portion. Transmittance of a smoke printed layer may be set lower than transmittance of an attenuation portion.

In the embodiments above, a plate thickness and transmittance of the attenuation portion 11 are substantially uniform in an overall region within which the display region 12 is provided. However, a thickness of an attenuation portion may vary at each position in an area within which a display region is provided.

In the embodiments above, the outer panel 10 is a one piece made of a single smoke material. However, an outer panel may be formed by, for example, laminating a smoke panel forming an attenuation portion and an operation surface panel forming a display region. The smoke panel may be replaced with a thin-film light-blocking layer similar to the smoke printed layer 22 as "a light-blocking portion", and provided to an outer panel.

In the embodiments above, the display element includes the negative liquid crystal panel 31 combined with the backlight. However, a configuration of a display element can be modified as needed. For example, a display element may have a positive liquid crystal panel combined with a backlight instead of a negative liquid crystal panel. A dot-matrix liquid crystal panel having a large number of pixels aligned in two-dimensional arrays and combined with a backlight may be adopted as a display element. A self-luminescent display panel, such as an organic EL panel, may be adopted as a display element. More than one display element as above may be provided to an operation device.

In the embodiments above, each of the display forming plates is formed by printing the smoke printed layer 22 and the light-blocking printed layer 23 on the light-transmitting base material sheet 21. However, a display forming plate may be formed by, for example, pasting an optical film corresponding to a smoke printed layer and a light-blocking printed layer to a light-transmitting base material sheet. A laminated body formed by laminating thin smoke plate and light-blocking plate corresponding, respectively, to "an attenuation layer" and "a light-blocking layer" may be adopted as a display forming member.

In the embodiments above, the light-passing openings 24 are simple openings provided to the light-blocking printed layer 23. However, a light-transmitting portion defining a shape of a symbol icon may be provided by filling an opening provided to a light-blocking printed layer with a light-transmitting coating material.

In the embodiments above, transmittance of the smoke printed layer 22 is set uniformly. However, transmittance of a smoke printed layer may vary with, for example, each symbol icon. When configured in such a manner, in a case where a color illuminated and indicated differs from one symbol icon to another, a difference in brightness a viewer may feel can be adjusted.

In the embodiments above, the backlight LEDs 34 and the symbol LEDs 54 are provided separately. However, status icons and symbol icons may be illuminated and indicated irradiated from a common light source.

The above has described a case where a characteristic configuration of the present disclosure is applied to an operation device operating an air-conditioning device of a vehicle. However, applications of the characteristic configuration are not limited to the operation device described above. For example, the characteristic configuration of the present disclosure is also applicable to a display device, such as a combination meter equipped to a vehicle, and a display device, such as a mobile terminal chiefly used outside a vehicle.

In order to achieve the object above, a display device according to a disclosed first configuration illuminates and indicates a plurality of display objects including at least a first display object and a second display object in a display region, and includes: an outer surface panel having an attenuation portion to emit light to illuminate and indicate the display objects while attenuating the light; a display element to emit light to enter the attenuation portion to indicate the first display object in the display region and enabled to change a display mode of the first display object; a light source irradiating light to illuminate and indicate the second display object in the display region; and a display forming member having a light-blocking layer, which is provided with a light-transmitting portion defining a shape of the second display object, and an attenuation layer covering the light-blocking layer from a side where the display region is present to attenuate light irradiated from the light source and passing through the light-transmitting portion, the display forming member causing light, which is attenuated through the attenuation layer, to enter the attenuation portion to illuminate and indicate the second display object in the display region.

According to the configuration as above, the light-blocking layer, which forms the light-transmitting portion on the display forming plate, is covered with the attenuation layer from the side where the display region is present. Hence, while illumination and indicate the display objects is stopped, intense extraneous light irradiated to the display region is attenuated not only in the attenuation portion of the outer surface panel but also in the attenuation layer of the display forming plate between the display region and the light-transmitting portion. Consequently, presence of the light-transmitting portion can be made hard to perceive for a viewer, when light is not emitted, without having to decrease light transmittance of the attenuation portion.

Reference numerals in parentheses merely indicate a correspondence with specific configurations in respective embodiments described below and do not limit the scope of the present invention.

While the present disclosure has been described according to the embodiments above, it should be understood that the present disclosure is not limited to the embodiments above and structure thereof. The present disclosure includes various modifications and alterations within the equivalent scope. In addition, various combinations and embodiments, as well as other combinations further including one element alone and more or less than one element are also within the scope and the idea of the present disclosure.

What is claimed is:

1. A display device to illuminate and indicate a plurality of display objects including at least a first display object and a second display object in a display region, comprising:
   an outer surface panel including an attenuation portion, which is to illuminate and indicate the display objects while attenuating light;
   a display element to cause light to enter the attenuation portion to illuminate and indicate the first display object in the display region and enabled to change a display mode of the first display object;
   a light source to irradiate light to illuminate and indicate the second display object in the display region; and
   a display forming member having a light-blocking layer, which has a light-transmitting portion defining a shape of the second display object, and an attenuation layer, which covers the light-blocking layer from a side where the display region is present to attenuate light irradiated from the light source and passing through the light-transmitting portion, the display forming member to cause light, which is attenuated through the attenuation layer, to enter the attenuation portion to illuminate and indicate the second display object in the display region, wherein
   the attenuation layer is made of a light-transmitting coating material,
   the display forming member has a translucent light-transmitting base material supporting the light-blocking layer and the attenuation layer and covering the display element from the side where the display region is present, and
   the attenuation layer is provided to the light-transmitting base material out of a region covering the display element.

2. The display device according to claim 1, wherein:
   the light-transmitting base material is located on a side where the attenuation portion is present relative to the attenuation layer.

3. A display device to illuminate and indicate a plurality of display objects including at least a first display object and a second display object in a display region, comprising:
   an outer surface panel including an attenuation portion, which is to illuminate and indicate the display objects while attenuating light;
   a display element to cause light to enter the attenuation portion to illuminate and indicate the first display object in the display region and enabled to change a display mode of the first display object;
   a light source to irradiate light to illuminate and indicate the second display object in the display region; and
   a display forming member having a light-blocking layer, which has a light-transmitting portion defining a shape of the second display object, and an attenuation layer, which covers the light-blocking layer from a side where the display region is present to attenuate light irradiated from the light source and passing through the light-transmitting portion, the display forming member to cause light, which is attenuated through the attenuation layer, to enter the attenuation portion to illuminate and indicate the second display object in the display region, wherein
   a light transmittance of the attenuation layer is higher than a light transmittance of the attenuation portion.

4. A display device to illuminate and indicate a plurality of display objects including at least a first display object and a second display object in a display region, comprising:

an outer surface panel including an attenuation portion, which is to illuminate and indicate the display objects while attenuating light;

a display element to cause light to enter the attenuation portion to illuminate and indicate the first display object in the display region and enabled to change a display mode of the first display object;

a light source to irradiate light to illuminate and indicate the second display object in the display region; and a display forming member having a light-blocking layer, which has a light-transmitting portion defining a shape of the second display object, and an attenuation layer, which covers the light-blocking layer from a side where the display region is present to attenuate light irradiated from the light source and passing through the light-transmitting portion, the display forming member to cause light, which is attenuated through the attenuation layer, to enter the attenuation portion to illuminate and indicate the second display object in the display region, wherein the attenuation portion is provided with an incident plane, on which light exiting from the display element and the display forming member is incident, and an exiting plane from which the light incident on the incident plane exits, and the incident plane is in a shape along the exiting plane.

5. A display device to illuminate and indicate a plurality of display objects including at least a first display object and a second display object in a display region, comprising:

an outer surface panel including an attenuation portion, which is to illuminate and indicate the display objects while attenuating light;

a display element to cause light to enter the attenuation portion to illuminate and indicate the first display object in the display region and enabled to change a display mode of the first display object;

a light source to irradiate light to illuminate and indicate the second display object in the display region; and a display forming member having a light-blocking layer, which has a light-transmitting portion defining a shape of the second display object, and an attenuation layer, which covers the light-blocking layer from a side where the display region is present to attenuate light irradiated from the light source and passing through the light-transmitting portion, the display forming member to cause light, which is attenuated through the attenuation layer, to enter the attenuation portion to illuminate and indicate the second display object in the display region, wherein the display element has a negative liquid crystal panel which decreases light transmittance when an operation of the display element is stopped.

6. The display device according to claim 1, wherein:
the light-transmitting coating material has an adjusted light transmittance.

7. The display device according to claim 6, wherein:
the attenuation layer is a smoke layer printed in a thin-film shape.

8. The display device according to claim 7, wherein:
the attenuation layer has a light transmittance that is 25 percent.

* * * * *